United States Patent Office 2,879,113
Patented Mar. 24, 1959

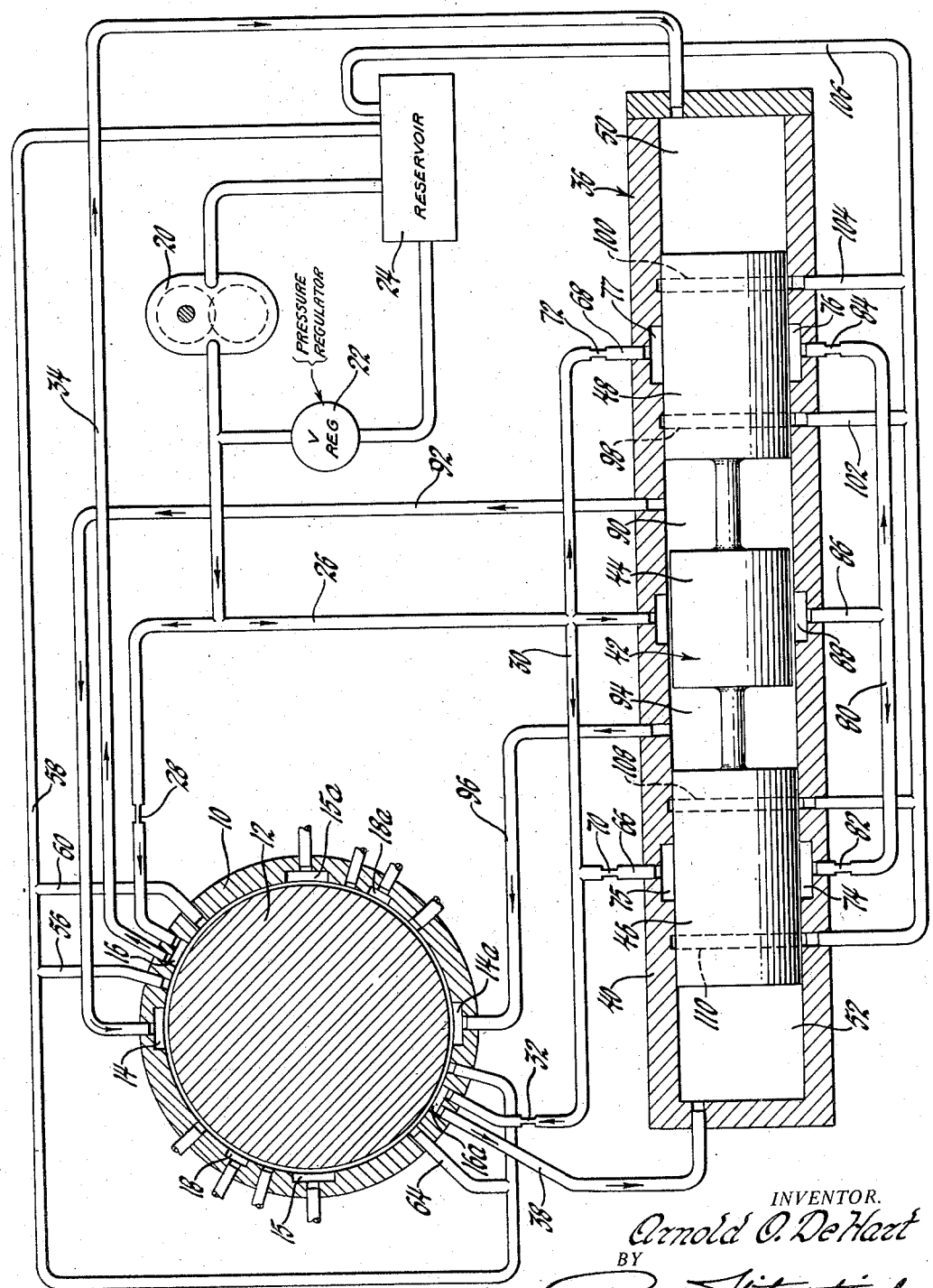

2,879,113

HYDROSTATIC BEARING

Arnold O. De Hart, Warren, Mich., assignor to General Motors Corporation, Detroit, Mich., a corporation of Delaware Application April 18, 1958, Serial No. 729,422

7 Claims. (Cl. 308—122)

This invention relates to bearing structures and more particularly pertains to bearing structures in which the rotating and/or reciprocating member is supported by a continuous fluid film.

A principal object of the invention is to provide an improved fluid pressure type bearing structure which is characterized in operation in that relative radial or lateral displacements of the components of the structure are automatically prevented.

Another object is to provide a bearing exhibiting extremely low friction losses.

Still another object is to provide a journal bearing structure in which the journal is maintained in a fixed, radial position relative to the bearing surface and in which such fixed radial position of the journal is independent of the load to which the bearing structure is subjected, to the extent of the load capacity of the system.

A principal feature of the invention resides in the control means whereby the objects aforesaid are accomplished, including the connections between such control means and the bearing structure proper.

The invention is illustrated in a preferred embodiment by the accompanying, essentially diagrammatic drawing.

Referring to the drawing, 10 denotes the bearing for the journal 12. Bearing 10 has therein a plurality of recesses which will be referred to hereinafter as "pads" because of the manner in which they function. These recesses or pads are of two categories. Thus, there are provided a plurality of control or pressure pads 14, 14a, 15 and 15a and a plurality of signal pads 16, 16a, 18 and 18a, each serving the near pressure pad. Since the two sets of pressure and signal pads, each made up of a pair of the diametrically opposed pressure pads and the signal pads adjacent thereto, are operated identically with like control means, only one control system is illustrated by the drawing, the same being shown applied to pads 14, 14a, 16 and 16a. It is to be understood that a like control system is used in the case of pressure pads 15 and 15a and signal pads 18 and 18a.

The apparatus illustrated includes a pump 20 adapted to supply fluid at the desired pressure, maintained by the regulator 22. The pump 20 draws from a reservoir or sump 24 and discharges to a conduit 26 one branch of which opens to the signal pad 16. Such branch has a restrictor therein at 28. The other branch of conduit 26 intersects a line 30 extending to the signal pad 16a. Such line has therein a restrictor 32.

Extending from the signal pad 16 is a conduit 34 which leads to a controller 36. Similarly, there extends from signal pad 16a a conduit 38 leading to the controller.

Controller 36 comprises a housing member 40 confining a spool component 42 having a central land 44 and two end lands 46 and 48. Land 48 forms with the housing 40 a chamber 50 into which the fluid from the conduit 34 is introduced. In like manner, land 46 forms with the housing 40 a chamber 52 receiving the fluid from the conduit 38.

Between pressure pad 14 and the corresponding signal pad 16 is a conduit 56 which connects with an exhaust line 58 extending to the reservoir 24. A conduit 60 spaced clockwise from the signal pad 16 also opens to the exhaust line 58.

One end of the common exhaust or return line 58 will be seen as disposed between the pressure pad 14a and the signal pad 16a. Spaced clockwise from the signal pad 16a is still another conduit 64 making connection with conduit 58.

Two short conduits 66 and 68 branching from pressure line 30, previously mentioned, have therein restrictors 70 and 72, respectively. Conduit 66 opens to a hydrostatic pad 75 formed in the housing 40 while conduit 68 opens to a similar pad 77 in the housing 40. A pair of lower pads 74 and 76 are interconnected and served by a pressure line 80 having therein restrictors 82 and 84. This line is supplied via conduit 26, an annular channel 88 in housing 40 and a conduit 86.

Although only two pairs of hydrostatic pads (74, 75 and 76, 77) appear in the drawing, it will be understood that in the usual installation balance will be achieved by means of additional pads spaced in opposition 90° from the illustrated pads about the same circumferences. These additional pads should be supplied from the pump 20 through separate restrictors just as the pads shown. The purpose of the hydrostatic pads will be later explained.

A chamber 90 rightward of the central land 44 and formed by such land and the end land 48 will be seen as communicating with pressure pad 14 in bearing 10 via a conduit 92. In like manner, a chamber 94 formed by the central land 44 and end land 46 connects with pressure pad 14a via a conduit 96.

Outward of the chamber 90 housing 40 is internally grooved to provide a pair of annular channels 98 and 100 connected by branch conduits 102 and 104 respectively, to an exhaust line 106. This exhaust line 106 also serves annular channels 108 and 110 formed in the housing 40 about the end land 46.

In operation of the system, fluid under system pressure flows through restrictor 28 to pad 16 whereafter it enters the clearance space between the journal 12 and the bearing 10—the rate of flow and the signal pad pressure being a function of the clearance. Considering conduit 34, it should be apparent that the pressure in the chamber 50 will be the same as the signal pad pressure.

As in the case of signal pad 16, the pressure fluid entering signal pad 16a via conduit 30 passes into the clearance between the journal and bearing and to the chamber 52 of controller 36. Thus, the pressure in the chamber 52 is at all times the same as the pressure in the signal pad 16a.

On the foregoing, it should be clear that if the clearances over pads 16 and 16a are equal, the pressures in chambers 50 and 52 are equal.

Fluid at system pressure also passes into the annular channel 88 about the central land 44, which throttles flow of fluid into the chambers 90 and 94. The latter communicate via lines 92 and 96 respectively with pressure pad 14 and pressure pad 14a. With this arrangement, it should be apparent that the pressure in chambers 90 and 94 will be the same so long as the central land 44 is in its normal or centered position relative to the annular channel 88. On the other hand, should the spool 42 become axially displaced in one direction or the other the pressure in the chamber 90 or 94 in the direction of the axial movement will become less than the pressure in the other chamber.

Fluid bleeding from the chamber 90 past the near portion of the end land 48 finds egress to exhaust via the annular groove 98 and the conduit 102. Annular groove 108 serves similarly with respect to chamber 94.

The purpose of hydrostatic pads 74, 75 and 76, 77 is to eliminate hysteresis with respect to the spool 42. Annular channels 110 and 100 collect fluid bleeding from these pads, such fluid being returned to exhaust, as previously indicated, via the conduit 106.

Let it be assumed now, that the load on the journal 12 becomes such that the same moves radially toward pressure pad 14a. In this event, the clearance over signal pad 16a is reduced with consequent reduction in the fluid flow through restrictor 32, resulting in a reduced pressure drop across such restrictor. Accordingly, the pressure in the signal pad 16a as well as in chamber 52 rises. The radial displacement of the journal 12 toward the pressure pad 14a, of course, increases the clearance between the journal and signal pad 16, a condition causing an increase in the exhaust flow from the latter pad and a reduction in the pressure in chamber 50. Due to the now higher pressure in chamber 52, spool 42 is caused to move axially rightward, reducing the pressure drop between annular groove 88 and chamber 94 and effecting an increase in the pressure in pad 14a. Contrariwise, the pressure in chamber 90 and pressure pad 14, becomes decreased due to the increase in the pressure drop between channel 88 and the chamber. Thus, the journal is caused to shift in the direction of pressure pad 14 until the pad pressures become equalized, a condition marked by recentering of the land 44 relative to the channel 88.

It will, of course, be understood that should the journal 12 be radially displaced by the load to which it is subject in a direction toward the pressure pad 14 rather than the pressure pad 14a, the action of the controller will be just the opposite of that described, i.e., the controller will cause an increase in the pressure at 14 and a decrease in the pressure at 14a to bring about the desired equalization.

What is claimed is:

1. A fluid pressure bearing system comprising: a pair of relatively moveable members arranged with a clearance therebetween, a pair of diametrically opposed pressure pads in one of said members, a pair of diametrically opposed signal pads in said one member, each of said signal pads being disposed near one of said pressure pads, a source of fluid pressure in communication with said signal pads via conduits having restrictors therein, exhaust conduit means serving each pressure pad and the corresponding signal pad, a controller communicating with said source and including a housing containing a spool element having three lands, said housing providing a chamber at either end of said spool, the central of said lands in its normal position being centrally located with respect to the port through which fluid from said pressure source enters the controller and exercising a throttling effect on such fluid as it passes into first and second chambers formed by such land and the other two lands, a fluid conduit between said first chamber and one of said pressure pads and a second fluid conduit between said second chamber and the other of said pressure pads.

2. A fluid pressure bearing system comprising: a bearing member, a journal in said bearing member having a diameter less than that of said bearing member to provide a clearance therebetween, a source of fluid pressure, a pair of diametrically opposed pressure pads in said bearing member, a pair of diametrically opposed signal pads in said bearing member and communicating with said source through conduit means having restrictors therein, each of said signal pads being disposed near one of said pressure pads, exhaust conduit means serving each of said pressure pads and the corresponding signal pad, a controller communicating with said source and including a housing containing a three-landed spool, said housing providing a chamber at either end of said spool, the central of said lands in its normal position being centrally located with respect to the port through which fluid from said pressure source enters said controller and exercising a throttling effect on such fluid as it passes into first and second chambers formed by such land and the other two lands, a fluid conduit between said first chamber and one of said pressure pads and a fluid conduit between said second chamber and the other of said pressure pads.

3. A bearing system according to claim 2 in which said controller comprises a plurality of hydrostatic pads surrounding each of said other lands and serving to substantially eliminate hysteresis of the said spool, said last pads being supplied with fluid from said source through conduits having restrictors therein and being open to each other and to said port through conduits provided with restrictors.

4. A fluid pressure bearing system comprising: a pair of relatively rotatable, telescopically related members having different diameters so that a clearance is provided therebetween, a pair of diametrically opposed pressure pads in one of said members, a pair of diametrically opposed signal pads in said one member, each of said signal pads being disposed near one of said pressure pads, a source of fluid pressure in communication with said signal pads via conduits having restrictors therein, exhaust conduit means serving each pressure pad and the corresponding signal pad, a controller communicating with said source and including a housing containing a three-landed spool, said housing providing a chamber at either end of said spool and having therein an annular channel into which the fluid from said source is fed, the central of said lands in its normal position being centrally located with respect to said channel and exercising a throttling effect on the fluid introduced into said channel as such fluid passes into first and second chambers formed by such land and the other two lands, a fluid conduit between said first chamber and one of said pressure pads and a second fluid conduit between said second chamber and the other of said pressure pads.

5. A bearing system according to claim 4 in which said controller comprises a plurality of hydrostatic pads surrounding each of said other lands and serving to substantially eliminate hysteresis of the said spool, said last pads being supplied with fluid from said source through conduits having restrictors therein and being open to each other and to said channel through conduits provided with restrictors.

6. A fluid pressure bearing system comprising: a bearing member, a journal in said bearing member having a diameter less than that of said bearing member to provide a clearance therebetween, a source of fluid pressure, a pair of diametrically opposed pressure pads in said bearing member, a pair of diametrically opposed signal pads in said bearing member and communicating with said source through conduit means having restrictors therein, each of said signal pads being disposed near one of said pressure pads, exhaust conduit means serving each of said pressure pads and the corresponding signal pad, a controller communicating with said source and including a housing containing a three-landed spool, said housing providing a chamber at either end of said spool and having an annular channel therein into which fluid entering the controller from said source is introduced, the central of said lands in its normal position being centrally located with respect to said channel and exercising a throttling effect on fluid passing from said channel into first and second chambers formed by such land and the other two lands, a fluid conduit between said first chamber and one of said pressure pads and the fluid conduit between said second chamber and the other of said pressure pads.

7. A bearing system according to claim 6 in which said controller comprises a plurality of hydrostatic pads surrounding each of said other lands and serving to substantially eliminate hysteresis of the said pool, said last pads being supplied with fluid from said source through conduits having restrictors therein and being open to each other and to said channel through conduits provided with restrictors.

No references cited.